United States Patent
Nettleton et al.

[11] Patent Number: 5,164,948
[45] Date of Patent: Nov. 17, 1992

[54] STABILIZED LOCAL OSCILLATOR FREQUENCY FOR HETERODYNE LASER SENSORS

[75] Inventors: John E. Nettleton, Fairfax Station; Dallas N. Barr, Woodbridge, both of Va.

[73] Assignee: The United States of America as represented by the Secretary of the Army, Washington, D.C.

[21] Appl. No.: 637,042

[22] Filed: Jan. 3, 1991

[51] Int. Cl.⁵ .................................. H01S 3/13
[52] U.S. Cl. ........................... 372/32; 372/18; 372/19; 372/20; 356/5; 356/28.5
[58] Field of Search ............... 372/18, 19, 32, 97, 372/20; 356/349, 350, 5, 28.5

[56] References Cited

U.S. PATENT DOCUMENTS

| | | | |
|---|---|---|---|
| 4,405,230 | 9/1983 | Tew et al. | 356/5 |
| 4,690,551 | 9/1987 | Edwards et al. | 356/5 |
| 4,716,444 | 12/1987 | Mongeon et al. | 356/5 |
| 4,777,825 | 10/1988 | Barre et al. | 356/349 |
| 4,856,893 | 8/1989 | Breen | 356/5 |
| 4,975,919 | 12/1990 | Amada et al. | 372/32 |

Primary Examiner—Georgia Y. Epps
Attorney, Agent, or Firm—Milton W. Lee; Max L. Harwell; Anthony T. Lane

[57] ABSTRACT

A stabilized local oscillator frequency for heterodyne laser sensors comprised of an acousto-optic crystal which provides a constant frequency offset $f_1$, to a portion of laser transmitter power at frequency $f_0$, for injection locking a separate local oscillator connected to a detector which simultaneous mixes $f_1$ with the return signal $f_0$ from a target. The detector outputs the difference frequency between $f_0 - f_1$ which is processed for the desired information. Proper local oscillator tuning is maintained through the use of a piezo-electric translator regulating the axial length of the local oscillator.

2 Claims, 1 Drawing Sheet

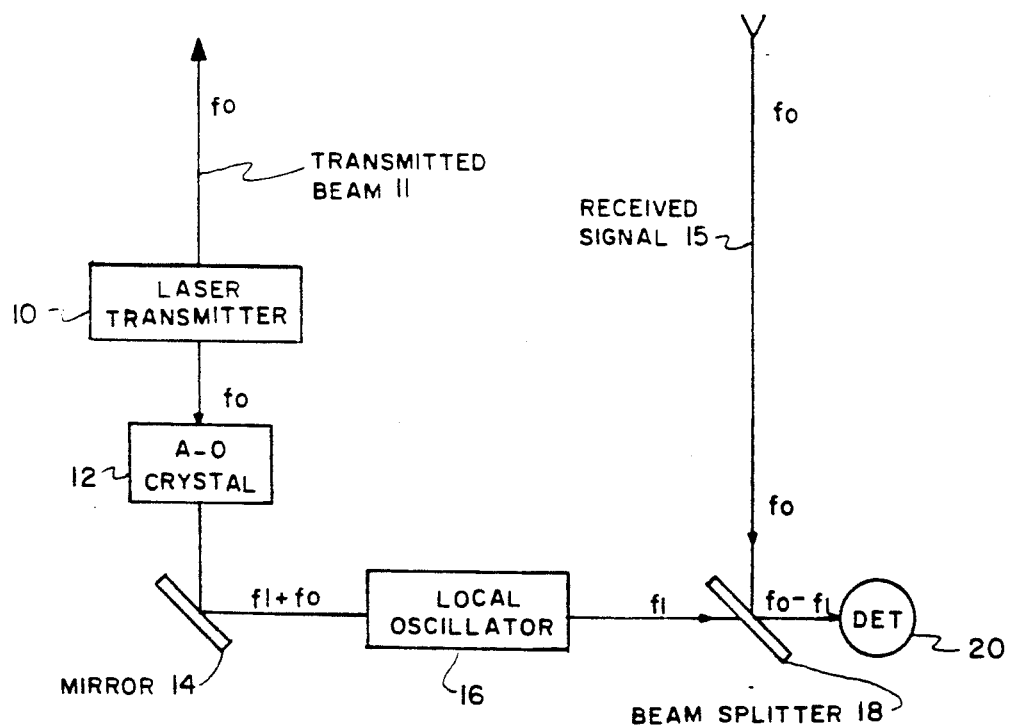

STABILIZED LOCAL OSCILLATOR FREQUENCY FOR HETERODYNE LASER SENSORS

The invention described herein may be manufactured, used, and licensed by the U.S. Government for governmental purposes without the payment of any royalties thereon.

BACKGROUND OF INVENTION

The invention is in the field of using an acousto-optic (AO) crystal to provide a constant frequency offset to a portion of the laser transmitter power for injection locking a separate laser oscillator. A problem exists in that heterodyne laser radar sensors required a stabilized local oscillator (LO). The LO must be at a constant offset frequency from the transmitted frequency since it is the frequency differences between the LO and the return signal, which consists of the transmitted frequency shifted by the doppler frequency $f_d$ of the target, that is processed when the two frequencies are mixed at an optical detector. If the LO is not stable in frequency offset with the transmitted frequency, erroneous measurements will be made. The present method insures LO stability in frequency offset.

Previous methods use either AO crystals for offset-homodyne or a separate locked laser to achieve the heterodyne effect. The use of AO crystals introduce a power reduction of 20% or more for each crystal used. The AO crystal may be placed in the LO leg to avoid power loss but an undesirable component of the LO radiation will pass through the AO crystal without the necessary frequency shift severely limiting the detection sensitivity. Also, it is very difficult to maintain a stable frequency offset with the transmitter when using a separate locked laser.

SUMMARY OF THE INVENTION

The present invention provides an efficient method to insure LO stability in frequency offset in heterodyne laser sensors. The method comprises the use of an AO crystal accepting a very small portion of the transmitting laser radiation and shifting the transmitter base frequency $f_0$ to a new frequency $f_1$ with some of $f_0$ passing through the AO crystal due to the imperfections in the crystal. The $f_0$ is however filtered out when the beam from the AO crystal is injected into the LO laser, separate from the laser transmitter, which is tuned to the $f_1$ frequency. The injected beam also locks the LO radiation to that of the transmitter. The radiation exiting the LO laser is frequency locked with the transmitted beam and contains only the desired shifted frequency $f_1$. The output of the LO is mixed with the return signal from a target $f_0+f_d$ by a detector which outputs the difference frequency, $f_0-f_1$, which is then processed for the desired information about the target, $f_d$.

BRIEF DESCRIPTION OF THE DRAWING

The lone drawing FIGURE is a schematic showing of the invention.

DETAILED DESCRIPTION OF THE PREFERRED EMBODIMENT

The method of the invention may be best understood when this description is taken in conjunction with the drawing. In the drawing, numeral 10 designates the laser transmitter which transmits beam 11 at a base frequency $f_0$ toward a target (not shown) and a very small portion of the transmitting laser radiation $f_0$ is directed through an AO crystal 12. Crystal 12 is preferably a Bragg Cell. Crystal 12 shifts the majority of $f_0$ to a new frequency $f_1$. Due to imperfections in 12 a minority portion of the original radiation at $f_0$ will also pass therethrough. Radiation at frequencies $f_1$ and $f_0$ are reflected off highly reflective mirror 14. The $f_0$ is filtered out when the beam is injected into the separate LO laser 16, which is tuned to frequency $f_1$. The injected beam also locks the LO 16 radiation to that of the transmitter 10 wherein the radiation exiting 16 is frequency locked with transmitted beam and contains only the desired shifted frequency $f_1$. Proper tuning for 16 may be maintained through use of a piezo-electric translator regulating the axial length of 16. The $f_1$ output from 16 is passed through a beam splitter 18 into a detector 20. The received signal 15, from the target, is received at the transmitting frequency $f_0$ shifted by the doppler frequency of a target $f_d$, which is then reflected off 18 into detector 20. The detector 20 will output the difference frequency, $f_0-f_1$ and $f_d$, which is then processed for the desired target information $f_d$, since $f_0$ and $f_1$ are known.

The method isolates the LO 16 frequency from the frequency of the transmitter 10 while simultaneously locking their frequencies with a constant offset. Having a separate LO laser 16 also provides better control and stability of the LO power incident on detector 20 as compared with the offset homodyne usage where LO power decreases proportionally as the transmitter power degrades.

We claim:

1. A method of providing a stabilized local oscillator frequency for heterodyne laser systems, including the steps of:

directing a small portion of a transmitting laser radiation beam at a frequency $f_0$ through an acousto-optic crystal which shifts the majority of $f_0$ to a new frequency $f_1$ and leaving a minority portion of $f_0$;

filtering out said minority portion of $f_0$ when the transmitter beam is injected into a local oscillator which is tuned to frequency $f_1$ in which the injected beam locks the local oscillator radiation to the transmitter radiation wherein radiation exiting said local oscillator crystal is frequency locked with the transmitted beam and contains only the shifted frequency $f_1$; and mixing the output shifted frequency $f_1$ from said local oscillator crystal with the returned frequency signal $f_0+f_d$ from a target to determine the frequency difference therebetween at an optical detector which is then processed for desired information about a target.

2. A method as set forth in claim 1 wherein the proper frequency tuning of said local oscillator is maintained through use of a piezo-electric translator regulating the axial length of said local oscillator.

* * * * *